P. P. KUNZ.
WHIFFLETREE-HOOK.
No. 179,572. Patented July 4, 1876.
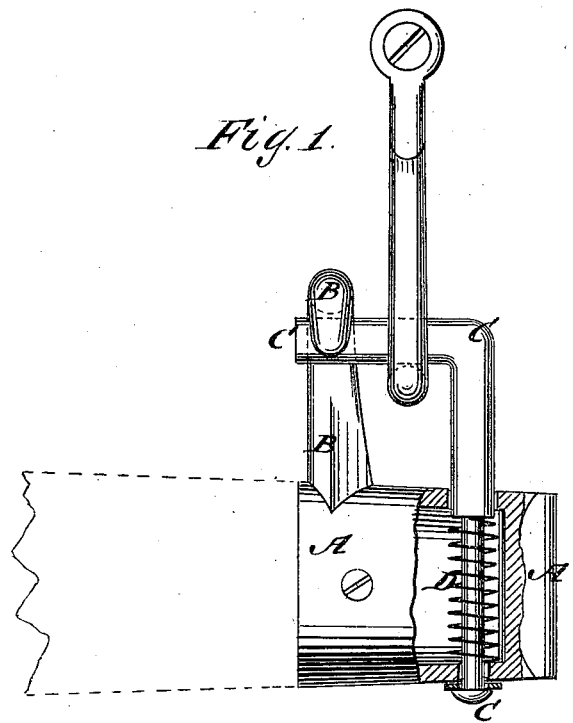
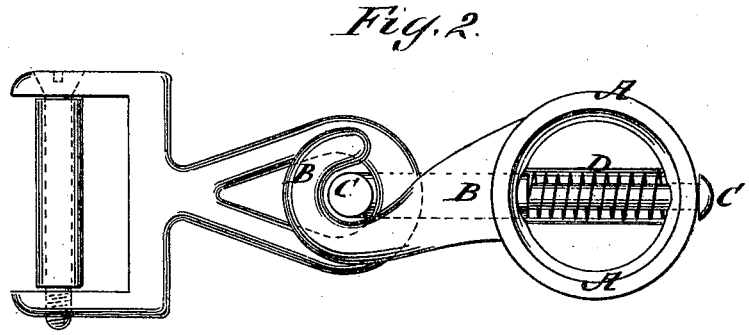
WITNESSES:
E. Wolff.
John Goethals
INVENTOR:
P. P. Kunz
BY
ATTORNEYS.

UNITED STATES PATENT OFFICE.

PETER P. KUNZ, OF FLORENCE, IOWA.

IMPROVEMENT IN WHIFFLETREE-HOOKS.

Specification forming part of Letters Patent No. 179,572, dated July 4, 1876; application filed April 10, 1876.

*To all whom it may concern:*

Be it known that I, PETER P. KUNZ, of Florence, county of Benton, and State of Iowa, have invented a new and useful Improvement in Whiffletree Hook and Ferrule, of which the following is a specification:

Figure 1 is a top view of the device, partly in section to show the construction. Fig. 2 is a detail view of the inner side of the same.

The object of this invention is to furnish an improved device for attachment to the end of a whiffletree, to receive the cockeye of the same, which shall be simple in construction, strong and durable, and will prevent the tug from becoming accidentally unfastened.

The invention consists in the ferrule, cast with its outer end solid, with a transverse hole formed through its outer part, and a hook-arm formed upon the forward side of its inner end, the sliding right-angled bar, and the spiral spring, constructed and arranged to operate in connection with each other, as hereinafter fully described.

Similar letters of reference indicate corresponding parts.

A is a ferrule, which is cast with a solid outer end. The ferrule A fits upon and is secured to the end of the whiffletree. Upon the forward side of the ferrule A is cast a hook-arm, B, in the cavity of which rests the end of the bar C. The bar C is bent at right angles, and its other arm passes through a hole in the ferrule A at the end of the whiffletree. Upon the rear end of the arm of the bar C, at the rear side of the ferrule A, are placed a washer and a head or nut. Upon the rear arm of the bar C, within the cavity of the ferrule A, is placed a spiral spring, D, one end of which rests against the inner surface of the ferrule A, and its other end rests against a shoulder formed upon the said bar C. The spring D holds the bar C pressed forward against the hook B, so that the tug or cockeye placed upon the said bar C cannot become accidentally detached. The tug is attached and detached by pressing the bar C to the rearward and turning its free end upward.

Having thus fully described my invention, I claim as new and desire to secure by Letters Patent—

The ferrule A, cast with its outer end solid, with a transverse hole formed through its outer part, and a hook-arm, B, formed upon the forward side of its inner end, the sliding right-angled bar C, and the spiral spring D, constructed and arranged to operate in connection with each other, substantially as herein shown and described.

PETER P. KUNZ.

Witnesses:
  H. H. SCHLOEMAN,
  JACOB HOFFERD.